United States Patent [19]
Wei et al.

[11] 4,050,780
[45] Sept. 27, 1977

[54] OPTICAL SYSTEM FOR A SCANNING APPARATUS WITH REFLECTOR PAIRS AT EACH END

[75] Inventors: John Shi Sun Wei; William Dickson Westwood, both of Ottawa, Canada

[73] Assignee: Northern Telecom Limited, Montreal, Canada

[21] Appl. No.: 740,067

[22] Filed: Nov. 8, 1976

[51] Int. Cl.² .................. G02B 27/17; G03B 27/70
[52] U.S. Cl. .......................... 350/6; 355/66; 355/51; 250/234
[58] Field of Search ................ 350/6, 7, 285; 355/41–43, 66, 8, 51, 49; 250/234, 235

[56] References Cited
U.S. PATENT DOCUMENTS

| | | | |
|---|---|---|---|
| 3,346,739 | 10/1967 | Jenkner | 350/6 |
| 3,709,602 | 1/1973 | Satomi | 350/6 |
| 3,752,558 | 8/1973 | Lloyd | 350/6 |
| 3,841,753 | 10/1974 | Ogawa | 355/8 |

FOREIGN PATENT DOCUMENTS 1,354,254  5/1974  United Kingdom ............... 355/51

*Primary Examiner*—Jon W. Henry
*Attorney, Agent, or Firm*—Sidney T. Jelly

[57] ABSTRACT

An optical system for a scanning apparatus uses a folded optical path with certain mirrors moving, the movement of the mirrors such that the length of the optical path, and thus the magnification, is maintained constant. Either a fixed or movable lens system can be provided. With a fixed lens system there is differential movement of mirrors. With a moving lens system, the lens system and image receiver move in fixed relationship with the scanning mirror.

9 Claims, 6 Drawing Figures

OPTICAL SYSTEM FOR A SCANNING APPARATUS WITH REFLECTOR PAIRS AT EACH END

This invention relates to an optical system for a scanning apparatus, and in particular for a scanning apparatus in which the overall dimensions are to be kept to a minimum.

A particular application of the invention is to a desk top scanning apparatus such as for a facsimile reader or detector imaging apparatus.

In a scanning apparatus, it is often necessary to reduce the page of material by a large factor. This may be because of a solid state detector device is being used as a read-out and size is a particular feature in the economy of such solid state devices, the smaller the device the cheaper generally.

Reductions of the order to be considered necessitate long optical paths. It is possible to fold the optical path to reduce overall dimensions, and this is readily done with a fixed optical system. However such a system then requires that the page of material being scanned must be moved or the optical system must be moved, as the page is illuminated for scanning line by line.

To be able to scan or read books, periodicals and similar items of material it is necessary that the material be kept stationary. This can be done by moving the first element of the optical system, e.g. a mirror, but this results in a variable length optical path when a folded optical path system is used. To maintain a constant length of optical path, and magnification, the whole optical system can be moved, but this requires considerable space as the optical system will move the length of a page, to give an overall length requirement equal to two page lengths.

The present invention provides for an optical system for a scanning apparatus, in which a stationary page is scanned progressively using a moving mirror system and using a folded optical path, but with provision for maintaining the length of the optical path, and thus the magnification, constant.

The invention will be readily understood by the following description of certain embodiments by way of example, in conjunction with the accompanying diagrammatic drawings, in which.

In all the Figures, corresponding items bear the same reference numerals.

Figure 1:
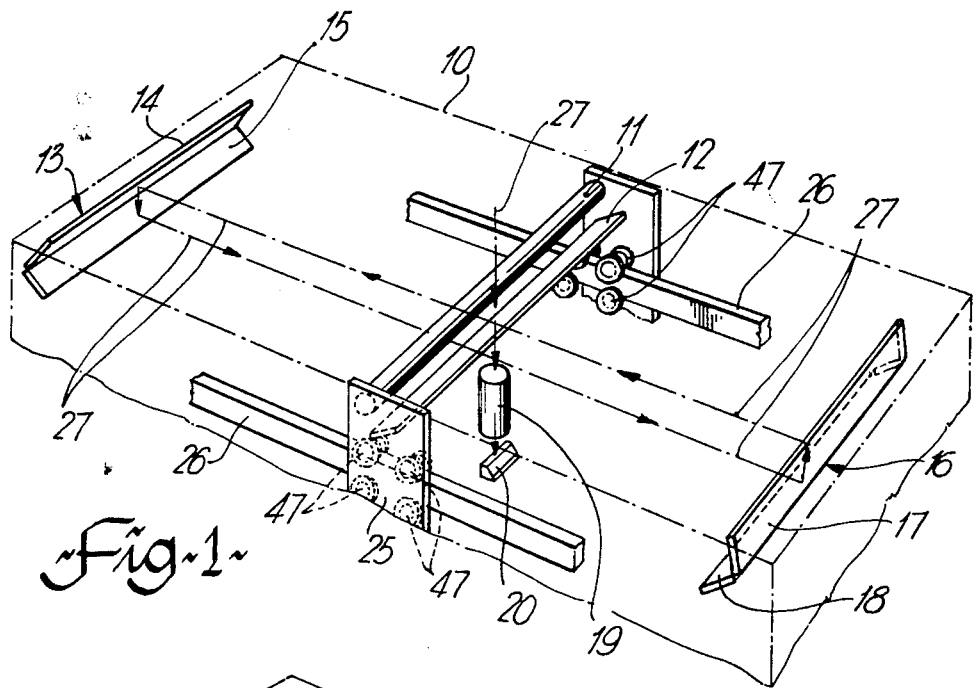
FIG. 1 illustrates in skeletal perspective an arrangement of the optical system.
Figure 2:
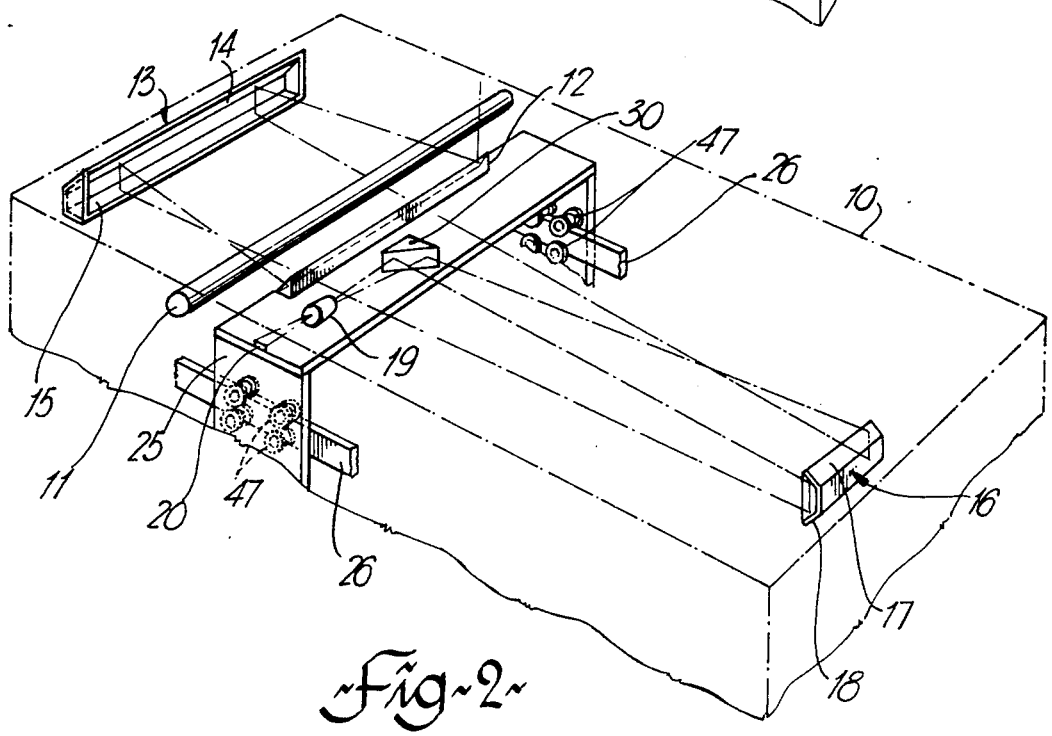
FIG. 2 is similar to FIG. 1, but illustrates a modification.

FIGS. 1 and 2 illustrate diagrammatically two alternative arrangements in which the optical path is folded to produce a system which gives a substantially reduced height, or thickness, in the direction normal to the plane of the material being viewed. In FIG. 1, the final portion of the path is normal to the plane of the material while in FIG. 2 the final portion is parallel. Thus, assuming the material is held horizontal the final part of the path is vertical in FIG. 1 and horizontal in FIG. 2.

Considering first FIG. 1, a transparent sheet 10 extends over the apparatus, the material to be viewed being placed on this sheet. Beneath the sheet 10 and in close proximity thereto is a strip lamp 11. A mirror 12 is positioned close to the lamp 11 inclined at 45° to reflect an image to one end of the apparatus. The mirror is positioned close to the sheet 10 and the lamp 11 but spaced relative to them such that the light rays forming an image of a strip across the material being viewed are reflected beneath the lamp to the end of the apparatus, without the lamp interfering.

At the end of the apparatus is fixed a reflector 13 composed of two mirrors 14 and 15 extending at right angles to each other across the apparatus. The mirrors 14 and 15 also are at 45° to a plane parallel to the plane of the transparent sheet 10, with the upper mirror 14 aligned optically with the mirror 12. Upper mirror 14 receives the light rays from mirror 12 and reflects them down to lower mirror 15. From the lower mirror 15 the rays are reflected back along the apparatus to the other end, passing below lamp 11 and mirror 12, to a further reflector 16.

Reflector 16 also is composed of two mirrors 17 and 18 at right angles to each other and each at 45° to a plane parallel to sheet 10. The lower mirror 18 is aligned optically with lower mirror 15 of reflector 13 and receives the rays from mirror 15, reflecting them to the upper mirror 17. Upper mirror 17 is aligned optically with mirror 12 and a reflecting surface is provided on the rear surface of this mirror. Effectively mirror 12 comprises two mirrors back to back. From the rear of mirror 12 the rays are reflected downwards to a lens system 19 and thence to an image receiving member 20. The member 20 can be a reading device which can be scanned electronically to produce output signals which can be fed, for example, to a remote printing device for reproduction of the material being viewed. Thus the present invention is particularly suitable for a reading device for coupling to a facsimile printer for transmission of printed material, drawings and the like, over a telephone line or other transmission link. The member 20 is conveniently a semiconductor device, for example using charge coupled devices (CCD's).

The lamp 11, mirror 12, lens system 19 and image receiving member 20 are mounted on a carriage 25 which is traversed from one end of the apparatus to the other, to scan the material resting on the sheet 10. Rails 26 can be provided for the carriage to run on, and the carriage can be traversed by means of an electric motor and suitable traversing mechanism, not shown. The length of the optical path, indicated at 27, does not vary as the carriage is traversed. Flexible leads are provided from the member 20. Amplification of the signals from the device can occur before and/or after the signals are fed from the member 20 to the exterior of the apparatus.

FIG. 2 is very similar to FIG. 1, and the same reference numerals are used where applicable. Thus in FIG. 2, transparent sheet 10 is provided and lamp 11 and mirror 12 are mounted below the sheet 10. Reflector 13 is provided at one end of the apparatus and reflector 16 at the other end. However in the arrangement of FIG. 2 instead of the light rays from the upper mirror 17 of reflector 16 being mirrored by a reflecting surface on the back of mirror 12, a further mirror, or reflector, 30 is provided. The plane of the mirror 30 is perpendicular to the transparent sheet 10, and is inclined at 45° to the longitudinal axis of the apparatus, reflecting sideways towards the side of the apparatus. Lens system 19 and image receiving member 20 are provided but these two latter members are now positioned in an optical path parallel to the sheet 10, instead of normal to the sheet 10 as in FIG. 1. The lamp 11, mirror 12, mirror 30 lens 19 and image receiver 20 are mounted on carriage 25.

FIG. 2 also illustrates some alternative forms for the various mirrors. Thus mirror 12 is shown as a relfecting surface on a prism. The reflectors 13 and 16 are also shown as prisms and the length of the reflector 16 is reduced. Mirror 30 is also shown as a reflecting surface of a prism but this can be a simple mirror.

The arrangement illustrated in FIG. 1, hereinafter referred to for convenience as the reader, is seen in more detail in FIGS. 3 and 4. The same reference nunmerals are used where applicable. The reader comprises a box-like housing having a base 41, ends 42, 43, sides 44, 45 and the transparent, for example glass, top 10. The rails 26 extend the length of the housing being mounted in bushings 46 attached to each end. The carriage is supported and travels, on the rails by rollers 47. Traversing of the carriage, as an example, is by toothed belts 48 driven at one end by toothed pulleys 49 mounted on a transverse shaft 50 in bushings 51, and rotated by a motor, indicated at 52, as by a worm gear 53. The belts 48 pass over pulleys 54 at the other end of the housing carried on a transverse shaft 55 supported in bushings 56. Clamping members 57 on the carriage engage with the belts 48. The motor 52 can have a two speed control giving a relatively slow speed one way when the material on the sheet 10 is being scanned and a higher reverse speed for returning the carriage 25. Obviously other forms of drive mechanism for moving the carriage can be provided. The motor 52 can be mounted inside the housing. Adjustment means can be provided for correctly tensioning the belts 48.

Figure 3:
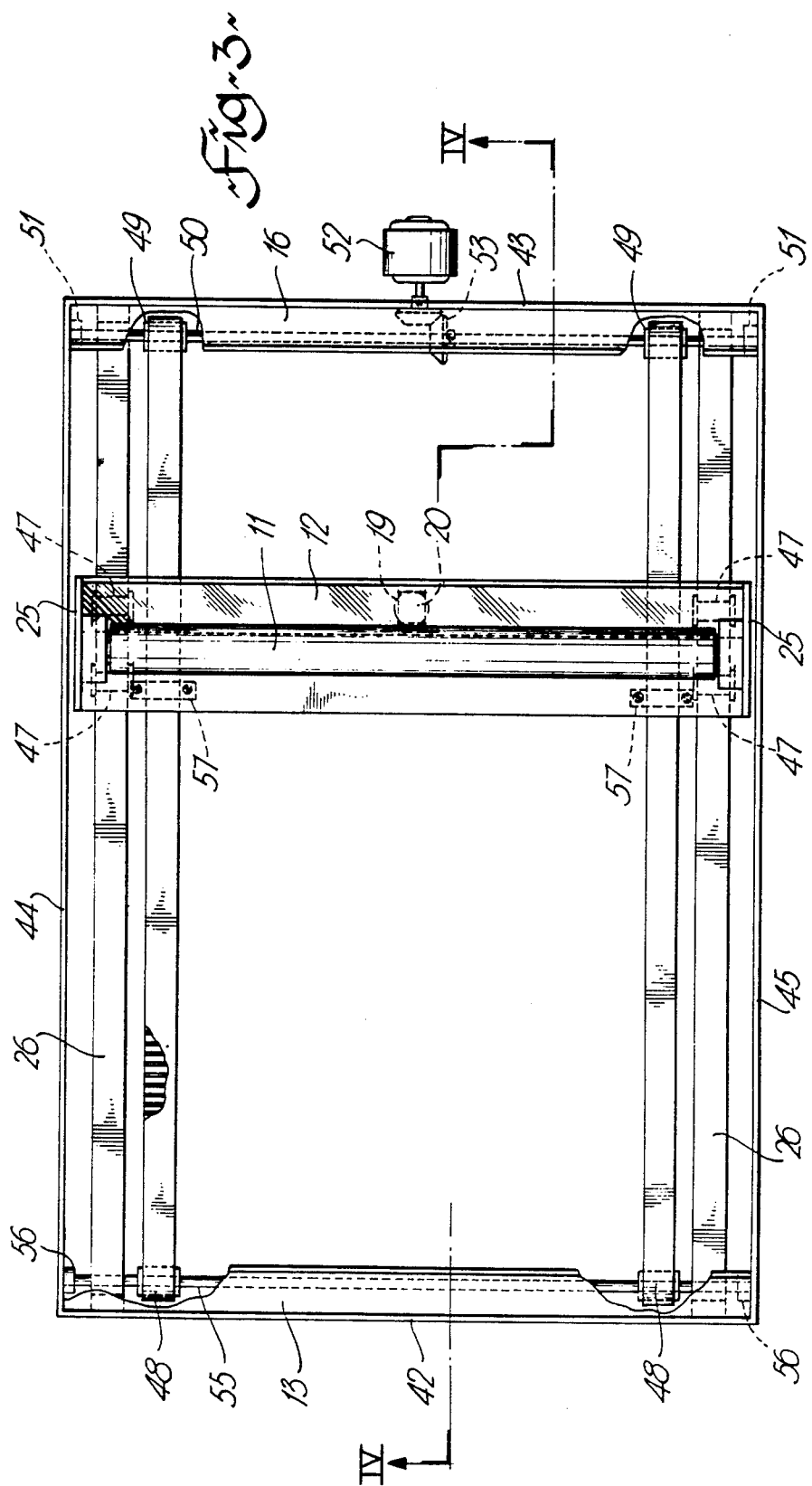
FIG. 3 is a plan view of an apparatus with the arrangement of optical system as in FIG. 1.
Figure 4:
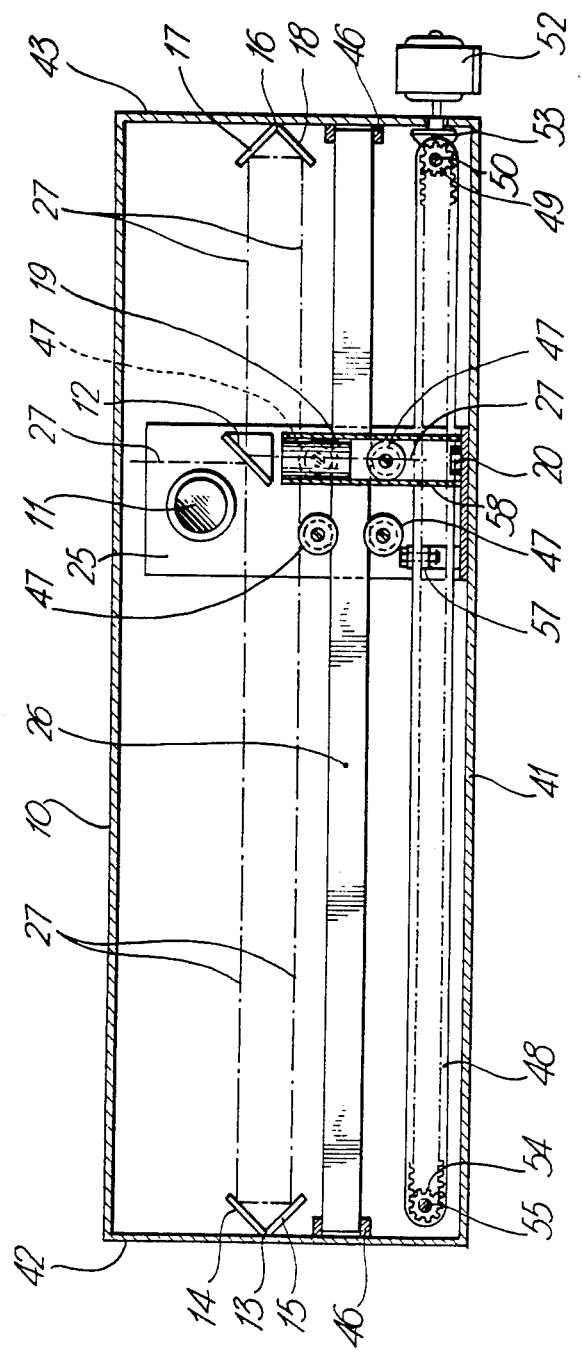
FIG. 4 is a cross-section on the line IV—IV of FIG. 3.

As will be seen from FIGS. 3 and 4, the two reflectors 13 and 16 are mounted on the ends 42 and 43. The lamp 11 and the mirror 12 are mounted at their ends on the ends of the carriage 25 and the lens system 19 is mounted in a housing 58 attached to the carriage base. Conveniently the lens housing 58 can fit over the member 20 and enclose it against undesired entry of light. In an alternative arrangement, not shown, the reflectors 13 and 16, rails 26 and belts 48, together with motor 52, can be mounted on the base 41 and the rest of the housing can be in the form of a removable cover.

Figure 6:
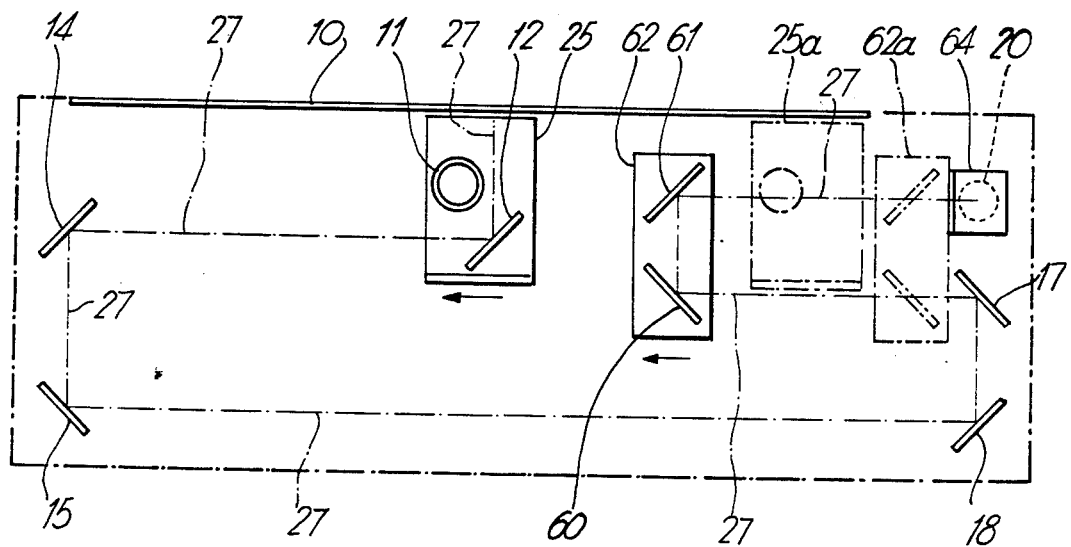
FIG. 6 is a cross-section on the line VI—VI of FIG. 5.
Figure 5:
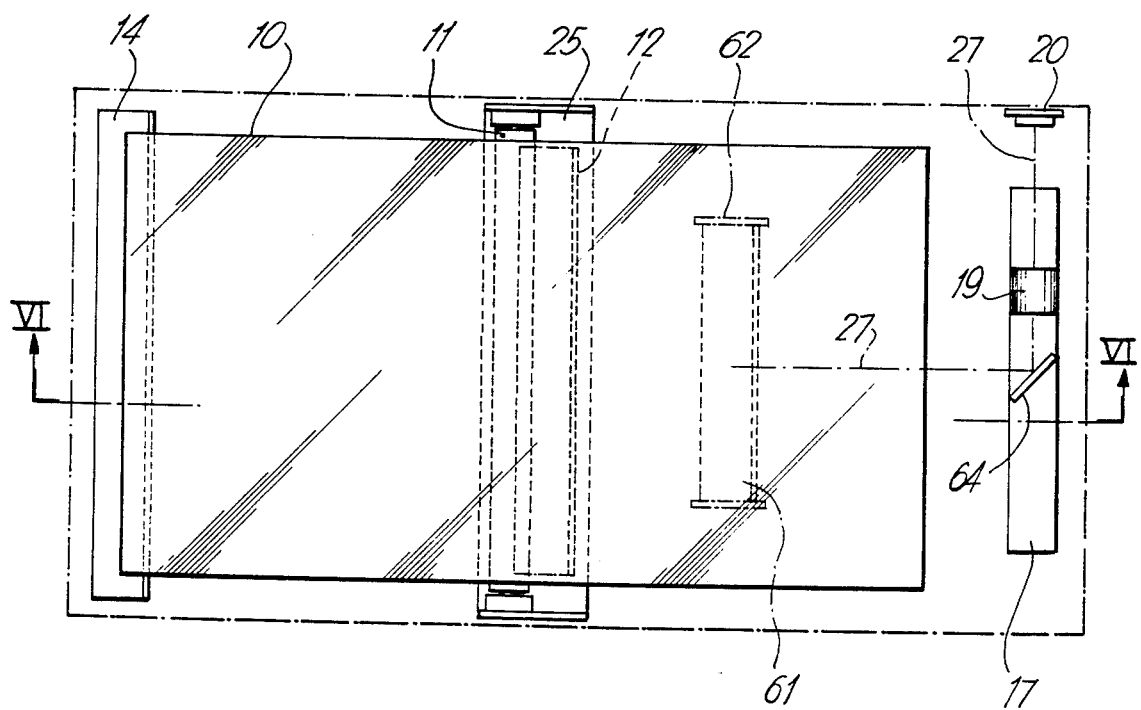
FIG. 5 is a plan view of an alternative system.

In the embodiments illustrated in FIGS. 1 to 4, the lamp and the first element of the optical system, the mirrors 12, moves and the lens system 19 and image receiving member 20 move in unison with the lamp and mirror. By this means the overall dimensions of the system are maintained substantially equal to the maximum size of the material to be scanned, or read. FIGS. 5 and 6 illustrate an alternative arrangement in which the lamp and first element move, as in FIGS. 1 to 4, but the lens system and image receiver are maintained stationary, with intermediate elements of the optical system being moved, at a predetermined relationship with the movement of the lamp and first element, to maintain the overall length of the optical path constant, and also the magnification. Particularly, a pair of associated mirrors are moved at a speed which is half of the speed of movement of the lamp and first element and with half the total movement of the lamp and first element.

As illustrated in FIGS. 5 and 6 the lamp 11 and first mirror 12 are mounted on a carriage 25 for reciprocal movement beneath the transparent sheet 10. Mirrors 14 and 15 extend across one end of the apparatus, as in FIGS. 1 to 4. Mirrors 17 and 18 are mounted at the other end of the apparatus. Mirror 12 and 14 are optically aligned and also mirrors 15 and 18, the rays reflected by mirror 12 to mirror 14, thence to mirror 15, to mirror 18 and then to mirror 17. As so far described the arrangement is very similar to that of FIGS. 1 to 4.

From mirror 17 the light rays are reflected back to a further pair of mirrors 60, 61. Mirror 60 is optically aligned with mirror 17, reflects the rays upwards to mirror 61 which then reflects the rays back towards the same end of the apparatus where mirrors 17 and 18 are mounted but at a higher level. The reflected rays from mirror 61 are received and reflected sideways by a mirror 64 — similar to mirror 30 in FIG. 2 — the rays then passing to the lens system 19 and to the image receiver 20.

At the start of "reading" material placed on the sheet 10 the carriages 25 and 62 would be at one end of the apparatus, as indicated at 25a and 62a in FIG. 6, for example. As carriage 25, with lamp 11 and mirror 12 traverses along the apparatus, scanning the material on the sheet 10, the carriage 62 is also traversed along the apparatus, but at half the speed at which carriage 25 moves. This maintains the length of the optical path between the material and the image receiver constant in length — and thus maintains the magnification constant, but in this example the lens system 19 and image receiver 20 are stationary.

The mounting of the mirrors, the lens systems 19 and the image receiver member 20 can be made independently adjustable. The length of the optical path 27 is associated with the reduction required and the lens system 19, particularly long focal length, aperture and depth of field.

Typical parameters for a reader are 200 lines per inch, scanning a standard page 8½ inches wide. This requires 1728 elements on the image receiver member 20 when the reader is coupled to a printer. With member 20 being a solid-state "read-out" device, for economy reasons it must be small - eg. 22.5 mm. This is readily achieved with the present invention with a complete reader capable of being placed in a desk drawer. Typical overall dimensions are slightly wider and longer than the size of material to be read or scanned. Thus, for example, an apparatus can be about 12 inches wide 12 to 14 inches long and about 3 to 4 inches high.

While the system, and apparatus, has been described with a moving lamp mounted adjacent to the mirror 12, it is possible to provide for illumination of the material to be viewed or scanned by means of stationary lamps. Thus a number of lamps may be positioned around the housing, or an optical system may be provided for impinging light rays from a lamp onto the material.

What is claimed is:

1. An optical system for a scanning apparatus, comprising;
   an elongated housing;
   a first mirror mounted in said housing for reciprocal movement therein for scanning of material positioned on said housing;
   second and third mirrors mounted at one end of said housing, the second mirror optically aligned with said first mirror for reception of light rays therefrom and for reflection rays to said third mirror;
   fourth and fifth mirrors mounted at the other end of said housing, the fourth mirror optically aligned with the third mirror for reception of said rays therefrom and for reflection of said rays to the fifth mirror;

a sixth mirror intermediate the ends of the housing and optically aligned with the fifth mirror for reception of said rays therefrom, the path of said rays from said sixth mirror extending to a lens system and then to an image receiver;

the sixth mirror mounted for reciprocal movement in said housing at a predetermined speed relationship with said lamp and first mirror, to maintain constant the total optical path length from said first mirror to said lens system.

2. An optical system as claimed in claim 1, including a lamp mounted adjacent to said first mirror for reciprocation with said mirror.

3. An optical system as claimed in claim 1, said sixth mirror optically aligned with said lens system, said sixth mirror, lens system and image receiver mounted for reciprocation at the same speed as and in the same direction as the lamp and first mirror.

4. An optical system as claimed in claim 3, said first mirror, sixth mirror, lens system and image receiver mounted on a common support member.

5. An optical system as claimed in claim 1, including a seventh mirror optically aligned with said sixth mirror, for reflection of said rays to said lens system, said sixth and seventh mirrors mounted for reciprocation at half the speed as, and in the same direction as, the lamp and first mirror.

6. A scanning apparatus comprising:
an elongate rectangular housing including a base, end walls and side walls, and a transparent top surface;
means for illuminating material positioned on said transparent top surface;
a first mirror mounted in said housing for reciprocal movement from one end wall to the other end wall for scanning of said material;
second and third mirrors mounted at one end of said housing, the second mirror optically aligned with said first mirror for reception of light rays therefrom and for reflection of said rays to said third mirror;

fourth and fifth mirrors mounted at the other end of said housing, the fourth mirror optically aligned with said third mirror for reception of said light rays therefrom and for reflection of said rays to said fifth mirror;

a sixth mirror intermediate the ends of said housing and optically aligned with the fifth mirror for reception of said light rays therefrom;

a lens system in said housing for reception of said light rays from said sixth mirror; and a semiconductor image receiving device optically aligned with said lens system;

said sixth mirror mounted for reciprocal movement in said housing in the same direction as said first mirror and at a predetermined speed relationship with said first mirror, to maintain constant the total optical path length from said first mirror to said lens system.

7. Apparatus as claimed in claim 6, said first mirror mounted on a carriage, said means for illuminating said material comprising a lamp mounted on said carriage adjacent to said first mirror; guide means in said housing, said carriage mounted on said guide means; and means for moving said carriage on said guide means for said reciprocal movement.

8. Apparatus as claimed in claim 7, said sixth mirror, said lens system and said image receiver mounted on said carriage.

9. Apparatus as claimed in claim 7, including a seventh mirror optically aligned with said sixth mirror for reception of said light rays threrefrom and for reflection of said light rays to said lens system; a further carriage in said housing, said sixth and seventh mirrors mounted on said further carriage; and means for moving said further carriage in the same direction as said carriage with said first mirror and at half the speed of said carriage and said first mirror.

* * * * *

UNITED STATES PATENT AND TRADEMARK OFFICE
CERTIFICATE OF CORRECTION

PATENT NO. : 4,050,780
DATED : September 27, 1977
INVENTOR(S) : John Shi Sun WEI; William Dickson WESTWOOD It is certified that error appears in the above-identified patent and that said Letters Patent are hereby corrected as shown below:

In the Claims:

Column 5, line 10, delete "lamp and".

Signed and Sealed this

Nineteenth Day of December 1978

[SEAL]

Attest:

RUTH C. MASON
Attesting Officer

DONALD W. BANNER
Commissioner of Patents and Trademarks